(12) United States Patent
Yang et al.

(10) Patent No.: US 10,968,386 B2
(45) Date of Patent: Apr. 6, 2021

(54) PENTAMETHINE CYANINE DYE AND PREPARATION METHOD THEREFOR

(71) Applicants: Shenzhen University, Guangdong (CN); Shenzhen Yiyang Science and Technology Co., Ltd., Guangdong (CN)

(72) Inventors: Zhigang Yang, Guangdong (CN); Junle Qu, Guangdong (CN); Wufan Liu, Guangdong (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 16/667,864

(22) Filed: Oct. 29, 2019

(65) Prior Publication Data
US 2020/0095499 A1 Mar. 26, 2020

Related U.S. Application Data (63) Continuation of application No. PCT/CN2018/071901, filed on Jan. 9, 2018.

(30) Foreign Application Priority Data

Jan. 9, 2018 (CN) .......................... 201810018423.4

(51) Int. Cl.
| | | |
|---|---|---|
| C09K 11/06 | (2006.01) | |
| C09B 23/08 | (2006.01) | |
| C09B 23/01 | (2006.01) | |

(52) U.S. Cl.
CPC .......... *C09K 11/06* (2013.01); *C09B 23/0025* (2013.01); *C09B 23/083* (2013.01); *C09K 2211/1018* (2013.01)

(58) Field of Classification Search
None
See application file for complete search history.

(56) References Cited

FOREIGN PATENT DOCUMENTS

| | | |
|---|---|---|
| CN | 1742057 A | 3/2006 |
| CN | 103146220 A | 6/2013 |
| CN | 103911016 A | 7/2014 |
| JP | H0330988 A | 2/1991 |
| JP | H0351181 A | 3/1991 |

*Primary Examiner* — Joseph R Kosack (57) ABSTRACT

Disclosed is a pentamethine cyanine dye of formula (I) and a method of producing the same, where the dye is suitable as a fluorescent material for the STORM and SOFI super-resolution imaging.

8 Claims, 6 Drawing Sheets

I$_n$a X = Y = C(CH$_3$)$_2$; II$_n$a X = Y = O; III$_n$a X = Y = S; IV$_n$a X = Y = NCH$_2$CH$_3$; V$_n$a X = C(CH$_3$)$_2$, Y = O; VI$_n$a X = C(CH$_3$)$_2$, Y = S; VII$_n$a X = C(CH$_3$)$_2$, Y = NCH$_2$CH$_3$; VIII$_n$a X = S, Y = O; IX$_n$a X = S, Y = NCH$_2$CH$_3$; X$_n$a X = O, Y = NCH$_2$CH$_3$

PENTAMETHINE CYANINE DYE AND PREPARATION METHOD THEREFOR

CROSS-REFERENCE TO RELATED APPLICATIONS

This application is a continuation of International Patent Application No. PCT/CN2018/071901, filed on Jan. 9, 2018. The content of the aforementioned application, including any intervening amendments thereto, is incorporated herein by reference in its entirety.

TECHNICAL FIELD

The application relates to material preparation, and more particularly to a pentamethine cyanine dye and a method of producing the same.

BACKGROUND OF THE INVENTION

Recently, with the development of molecular fluorescence detection and imaging technology, numerous powerful tools have been developed for the research and detection in the field of life science, such as the detection instruments based on molecular fluorescence imaging, confocal fluorescence imaging microscopes and fluorescence spectrum/lifetime instruments. Based on the above theory, the super-resolution imaging technology has achieved a great progress to break through the limitation of optical diffraction and obtain a fine structure imaging of small targets with a size smaller than 200 nm.

Stochastic optical reconstruction microscopy (STORM) is a novel super-resolution imaging method which is greatly dependent on the performance of fluorescent materials. At present, Alexa647 is generally considered to be a more suitable fluorescent material for STORM due to the better performance, but the use of these materials is limited due to the small quantities. Moreover, there are still some defects in the application of the super-resolution imaging in the analysis of living cells, affecting the normal use. In addition, for the super-resolution optical fluctuation imaging (SOFI), the fluorescent materials are required to have a photo-induced blinking effect, but the suitable fluorescent materials are currently unavailable.

SUMMARY OF THE INVENTION

An object of the invention is to provide a pentamethine cyanine dye and a method of producing the same to overcome the problem of lack of suitable fluorescent materials for STORM and SOFI.

In a first aspect, the invention provides a pentamethine cyanine dye of formula (I):

wherein X and Y are independently selected from O, S, $C(CH_3)_2$ and $NR_6$;
$R_1$ is $(CH_2)_n R_7$ or $(CH_2)_m C_6 H_4 R_7$;
$R_2$ and $R_3$ are independently selected from H, halogen, $(CH_2)_n R_8$, $CH_2 C_6 H_4 R_8$, $SO_3 H$, $SO_3^-$, $OCH_3$, $SCH_3$, benzyloxy group, $NO_2$, $O(CH_2)_n R_8$, $OCH_2 C_6 H_4 R_8$ and CN;
$R_4$ and $R_5$ are independently selected from $CH_3$, $CH_2 CH_3$, $CH_2 C_6 H_5$, $CH_2 C_6 H_4 F$, $(CH_2)_n R_8$ and $CH_2 C_6 H_4 R_8$;
$R_6$ is $(CH_2)_n R_8$ or $CH_2 C_6 H_4 R_8$;
$R_7$ is selected from H, ethynyl, vinyl, phenyl, naphthyl, imidazole, pyrazole, oxazole, thiazole, furan, pyrrole heterocycle, $C_6 H_4 R_9$, phenylboronic acid alcohol ester, propargyl, folic acid, methotrexate, arginine(R)-glycine(G)-aspartic acid(D) (RGD), biotin, $SO_3 R_{10}$ and $COOR_{11}$;
$R_8$ is H, $SO_3 R_{10}$ or $COOR_{11}$;
$R_9$ is selected from H, arsonic acid, boric acid, carboxylic acid, sulfonic acid, $C_1$-$C_{18}$ alkyl, amino, O and S;
$R_{10}$ is $N(R_{12} R_{13} R_{14} R_{15})$; $R_{11}$ is a $C_1$-$C_{18}$ alkyl; $R_{12}$, $R_{13}$, $R_{14}$ and $R_{15}$ are independently selected from H, $C_1$-$C_{18}$ alkyl, $(CH_2)_m OR_8$ and $(CHR_9 CH_2 O)_p R_8$;
m, n and p are integers independently selected from 1-18.

In a second aspect, this application provides a first method of preparing the pentamethine cyanine dye, comprising:

(1) mixing glycerin, a benzaldehyde derivative and a toluene derivative in a mass ratio of 1:2-2.5:0.05-0.2; refluxing the reaction mixture at 50-60° C. for 6-10 h; removing water generated during the refluxing, and cooling the reaction mixture; washing the reaction mixture with an alkali solution; and subjecting the reaction mixture to extraction, drying and desolventization to give a paste intermediate (I);

(2) preparing a condensing agent from the intermediate (I);

(3) reacting indoline, benzoindole, benzothiazole, benzoxazole or benzimidazole containing a 2,3,3-trimethyl-5-$R_2$ ($R_3$)-3H substituent with $R_4(R_5)CH_2 Z$ in a mass ratio of 1:1-4 at 80-148° C. for 6-36 h to obtain a quaternary ammonium salt; and (4) mixing the condensing agent, an alcohol, the quaternary ammonium salt and anhydrous pyridine in a mass ratio of 1:0.8-2:2-3:0.8-1.2; refluxing the reaction mixture at 50-60° C. under nitrogen until the reaction mixture appears to be dark blue; cooling the reaction mixture to room temperature; and subjecting the reaction mixture to desolventization, washing, separation and purification to obtain the pentamethine cyanine dye;

wherein X and Y are independently selected from O, S, $C(CH_3)_2$ and $NR_6$;
$R_1$ is $(CH_2)_n R_7$ or $(CH_2)_m C_6 H_4 R_7$;
$R_2$ and $R_3$ are independently selected from H, halogen, $(CH_2)_n R_8$, $CH_2 C_6 H_4 R_8$, $SO_3 H$, $SO_3^-$, $OCH_3$, $SCH_3$, benzyloxy group, $NO_2$, $O(CH_2)_n R_8$, $OCH_2 C_6 H_4 R_8$ and CN;
$R_4$ and $R_5$ are independently selected from $CH_3$, $CH_2 CH_3$, $CH_2 C_6 H_5$, $CH_2 C_6 H_4 F$, $(CH_2)_n R_8$ and $CH_2 C_6 H_4 R_8$;
$R_6$ is $(CH_2)_n R_8$ or $CH_2 C_6 H_4 R_8$;
$R_7$ is selected from H, ethynyl, vinyl, phenyl, naphthyl, imidazole, pyrazole, oxazole, thiazole, furan, pyrrole heterocycle, $C_6 H_4 R_9$, phenylboronic acid alcohol ester, propargyl, folic acid, methotrexate, RGD, biotin, $SO_3 R_{10}$ and $COOR_{11}$;
$R_8$ is H, $SO_3 R_{10}$ or $COOR_{11}$;
$R_9$ is selected from H, arsonic acid, boric acid, carboxylic acid, sulfonic acid, $C_1$-$C_{18}$ alkyl, amino, O and S;
$R_{10}$ is $N(R_{12} R_{13} R_{14} R_{15})$; $R_{11}$ is a $C_1$-$C_{18}$ alkyl; $R_{12}$, $R_{13}$, $R_{14}$ and $R_{15}$ are independently selected from H, $C_1$-$C_{18}$ alkyl, $(CH_2)_m OR_8$ and $(CHR_9 CH_2 O)_p R_8$;
m, n and p are integers independently selected from 1-18.

In an embodiment, step (2) specifically comprises:

mixing the intermediate (I) and a solvent in a mass ratio of 1:1-4; adding an alkaline matter and a reactant to perform a reaction in a cold water bath; subjecting the reaction mixture to separation and purification to give an intermediate (II); acetalizing the intermediate (II) under acidic conditions to obtain a condensing agent.

In an embodiment, in step (2), the solvent is tetrahydrofuran, and the mass ratio of the intermediate (I) to tetrahydrofuran is 1:1-3; the reaction is performed for 0.5-1 h; and an oxidant is used during the acetalization.

In an embodiment, in step (2), a mass ratio of the alkaline matter to the intermediate (I) is 1:0.1-0.3; the alkaline matter is selected from potassium hydroxide, sodium hydroxide, sodium carbonate and a combination thereof; the reactant is selected from propargyl bromide, butane sultone, propynyloxy ethoxy bromine, benzyl bromide, 4-nitrobenzyl bromide, sulfate, p-toluenesulfonate and a combination thereof; and the oxidant is pyridinium chlorochromate (PCC), Jones reagent or a combination thereof.

In an embodiment, step (2) specifically comprises:

mixing the intermediate (I) and a solvent in a mass ratio of 1:2-4; adding an organic base to perform a reaction for 1-2 h in an ice bath, wherein a mass ratio of the intermediate (I) to the organic base is 1:0.1-0.3; subjecting the reaction mixture to separation and purification; reacting the reaction mixture with anhydrous acetonitrile or DMF for 1-2 h; adding a phenolic derivative and an alkaline matter to perform a reaction for 2-3 h; subjecting the reaction mixture to desolventization, washing, separation and purification to give an intermediate (II); acetalizing the intermediate (II) under acidic conditions in the presence of an oxidant to obtain a condensing agent;

wherein a mass ratio of anhydrous acetonitrile or DMF to the reaction mixture is 3-5:1; a mass ratio of the phenolic derivative to the intermediate (I) is 0.9-1.1:1; a mass ratio of the alkaline matter to the intermediate (I) is 0.1-0.3:1.

In an embodiment, in step (2), the solvent is dichloromethane or anhydrous chloroform; the organic base is triethylamine or DIPEA; and the phenolic derivative is selected from 4-methylphenol, 4-nitrophenol, 4-chlorophenol, 1-naphthol, 2-naphthol and a combination thereof.

In an embodiment, in step (4), the alcohol is ethanol or isopropanol.

In a third aspect, this application provides a second method of preparing the pentamethine cyanine dye, comprising:

(1) mixing glycerin, a benzaldehyde derivative and a toluene derivative in a mass ratio of 1:2-2.5:0.05-0.2; refluxing the reaction mixture at 50-60° C. for 6-10 h; removing water generated during the refluxing and cooling the reaction mixture; washing the reaction mixture with an alkali solution; and subjecting the reaction mixture to extraction, drying and desolventization to give a paste intermediate (I);

(2) preparing a condensing agent from the intermediate (I);

(3) reacting indoline, benzoindole, benzothiazole, benzoxazole or benzimidazole containing a 2,3,3-trimethyl-5-R2 (R3)-3H substituent with $R_4(R_5)CH_2Z$ in a mass ratio of 1:1-4 at 80-148° C. for 6-36 h to obtain a quaternary ammonium salt; and (4) mixing the condensing agent, an alcohol, the quaternary ammonium salt and anhydrous pyridine in a mass ratio of 6:2-4:0.8-2:0.8-1.2; refluxing the reaction mixture at 50-60° C. under nitrogen until the reaction mixture appears to be yellowish green; and subjecting the reaction mixture to desolventization, separation and purification to obtain a yellow intermediate (III);

dissolving the yellow intermediate (III) with isopropanol; adding anhydrous pyridine and the quaternary ammonium salt to the reaction mixture respectively in a mass ratio of 0.1-0.3:1 and 0.1-0.2:1; reacting the reaction mixture at 50-60° C. for 5-6 h; cooling the reaction mixture to room temperature; and subjecting the reaction mixture to desolventization, separation and purification to produce the pentamethine cyanine dye;

wherein X and Y are independently selected from O, S, $C(CH_3)_2$ and $NR_6$;

$R_1$ is $(CH_2)_nR_7$ or $(CH_2)_mC_6H_4R_7$;

$R_2$ and $R_3$ are independently selected from H, halogen, $(CH_2)_nR_8$, $CH_2C_6H_4R_8$, $SO_3H$, $SO_3^-$, $OCH_3$, $SCH_3$, benzyloxy group, $NO_2$, $O(CH_2)_nR_8$, $OCH_2C_6H_4R_8$ and CN;

$R_4$ and $R_5$ are independently selected from $CH_3$, $CH_2CH_3$, $CH_2C_6H_5$, $CH_2C_6H_4F$, $(CH_2)_nR_8$ and $CH_2C_6H_4R_8$;

$R_6$ is $(CH_2)_nR_8$ or $CH_2C_6H_4R_8$;

$R_7$ is selected from H, ethynyl, vinyl, phenyl, naphthyl, imidazole, pyrazole, oxazole, thiazole, furan, pyrrole heterocycle, $C_6H_4R_9$, phenylboronic acid alcohol ester, propargyl, folic acid, methotrexate, RGD, biotin, $SO_3R_{10}$ and $COOR_{11}$;

$R_8$ is H, $SO_3R_{10}$ or $COOR_{11}$;

$R_9$ is selected from H, arsonic acid, boric acid, carboxylic acid, sulfonic acid, $C_1$-$C_{18}$ alkyl, amino, O and S;

$R_{10}$ is $N(R_{12}R_{13}R_{14}R_{15})$; $R_{11}$ is a $C_1$-$C_{18}$ alkyl; $R_{12}$, $R_{13}$, $R_{14}$ and $R_{15}$ are independently selected from H, $C_1$-$C_{18}$ alkyl, $(CH_2)_mOR_8$ and $(CHR_9CH_2O)_pR_8$; and m, n and p are integers independently selected from 1-1.

In an embodiment, step (2) specifically comprises:

mixing the intermediate (I) and a solvent in a mass ratio of 1:1-4; adding an alkaline matter and a reactant to perform a reaction in a cold water bath; subjecting the reaction mixture to separation and purification to give an intermediate (II); acetalizing the intermediate (II) under acidic conditions to obtain a condensing agent.

In an embodiment, in step (2), the solvent is tetrahydrofuran, and the mass ratio of the intermediate (I) to tetrahydrofuran is 1:1-3; the reaction is performed for 0.5-1 h; and an oxidant is used during the acetalization.

In an embodiment, in step (2), a mass ratio of the alkaline matter to the intermediate (I) is 1:0.1-0.3; the alkaline matter is selected from potassium hydroxide, sodium hydroxide, sodium carbonate and a combination thereof; the reactant is selected from propargyl bromide, butane sultone, propynyloxy ethoxy bromine, benzyl bromide, 4-nitrobenzyl bromide, sulfate, p-toluenesulfonate and a combination thereof; and the oxidant is pyridinium chlorochromate (PCC), Jones reagent or a combination thereof.

In an embodiment, step (2) specifically comprises:

mixing the intermediate (I) and a solvent in a mass ratio of 1:2-4; adding an organic base to perform a reaction for 1-2 h in an ice bath, wherein a mass ratio of the intermediate (I) to the organic base is 1:0.1-0.3; subjecting the reaction mixture to separation and purification; reacting the reaction mixture with anhydrous acetonitrile or DMF for 1-2 h; adding a phenolic derivative and an alkaline matter to perform a reaction for 2-3 h; subjecting the reaction mixture to desolventization, washing, separation and purification to give an intermediate (II); acetalizing the intermediate (II) under acidic conditions in the presence of an oxidant to obtain a condensing agent;

wherein a mass ratio of anhydrous acetonitrile or DMF to the reaction mixture is 3-5:1; a mass ratio of the phenolic derivative to the intermediate (I) is 0.9-1.1:1; a mass ratio of the alkaline matter to the intermediate (I) is 0.1-0.3:1.

In an embodiment, in step (2), the solvent is dichloromethane or anhydrous chloroform; the organic base is triethylamine or DIPEA; and the phenolic derivative is selected from 4-methylphenol, 4-nitrophenol, 4-chlorophenol, 1-naphthol, 2-naphthol and a combination thereof.

In an embodiment, in step (4), the alcohol is ethanol or isopropanol.

The invention provides a pentamethine cyanine dye and a method of producing the same, where this method introduces an oxygen-free substituent $R_1$ in formula (I) to produce a novel class of centrally oxygen-monosubstituted pentamethine cyanine dyes, facilitating the single marker analysis of biological structures and the improvements of dyes in photophysical properties such as photobleaching resistance and photo-induced blinking property. In addition, the pentamethine cyanine dye also has characteristics of large molar absorption coefficient, adjustable absorption and emission wavelengths, simple preparation, moderate fluorescence quantum yield and good cell compatibility, and thus it is suitable for the fluorescence imaging. Considering the presence of photo-induced blinking property, the pentamethine cyanine dye is suitable as an ideal fluorescent material for STORM and SOFT super-resolution imaging.

BRIEF DESCRIPTION OF THE DRAWINGS

The invention will be further described below with reference to the drawings and embodiments to more clearly illustrate the technical solutions of the invention and the prior art. It is apparent that provided below are merely some embodiments of the invention.

DETAILED DESCRIPTION OF EMBODIMENTS

In order to make the object, features and advantages of the invention more obvious and understandable, the invention will be described below in detail with reference to the drawings. It is apparent that described below are merely part of the embodiments of the invention and are not intended to limit the invention. Any other embodiments obtained by those skilled in the art b without sparing any creative efforts should fall within the scope of the invention.

The invention provides a pentamethine cyanine dye of formula (I):

where X and Y are independently selected from O, S, $C(CH_3)_2$ and $NR_6$;
$R_1$ is $(CH_2)_nR_7$ or $(CH_2)_mC_6H_4R_7$;
$R_2$ and $R_3$ are independently selected from H, halogen, $(CH_2)_nR_8$, $CH_2C_6H_4R_8$, $SO_3H$, $S_3^-$, $OCH_3$, $SCH_3$, benzyloxy group, $NO_2$, $O(CH_2)_nR_8$, $OCH_2C_6H_4R_8$ and CN;
$R_4$ and $R_5$ are independently selected from $CH_3$, $CH_2CH_3$, $CH_2C_6H_5$, $CH_2C_6H_4F$, $(CH_2)_nR_8$ and $CH_2C_6H_4R_8$; and
m and n are integers independently selected from 1-18.

The invention provides a pentamethine cyanine dye and a method of producing the same. Since the pentamethine cyanine dye has advantages of large molar absorption coefficient, adjustable absorption and emission wavelengths, simple operation, a low fluorescence quantum yield and a low cytotoxicity, it is suitable as a fluorescent imaging material. In addition, the pentamethine cyanine dye also has the photo-induced blinking property, and thus it is suitable for the STORM and SOFI super-resolution imaging.

In an embodiment, $R_6$ is $(CH_2)_nR_8$ or $CH_2C_6H_4R_8$.

In an embodiment, $R_7$ is H, ethynyl, vinyl, phenyl, naphthyl, imidazole, pyrazole, oxazole, thiazole, furan, pyrrole heterocycle, $C_6H_4R_9$, phenylboronic acid alcohol ester, propargyl, folic acid, methotrexate, RGD, biotin, $SO_3R_{10}$ or $COOR_{11}$.

In an embodiment, $R_8$ is H, $SO_3R_{10}$ or $COOR_{11}$.

In an embodiment, $R_{10}$ is $N(R_{12}R_{13}R_{14}R_{15})$.

In an embodiment, $R_{11}$ is $C_{1-18}$ alkyl.

In an embodiment, $R_{12}$, $R_{13}$, $R_{14}$ and $R_{15}$ are independently selected from H, $C_{1-18}$ alkyl, $(CH_2)_mOR_8$ or $(CHR_9CH_2O)_pR_8$, m and p are integers independently selected from 1-18.

In an embodiment, $R_9$ is H, arsonic acid, orthoboric acid, carboxylic acid, sulfonic acid, $C_{1-18}$ alkyl, amino, oxygen or sulfur.

In an embodiment, $R_1$ excludes methyl, ethyl and propyl.
In an embodiment, the formula of the pentamethine cyanine dye is selected from the group consisting of:

II$_n$a

III$_n$a

IV$_n$a

V$_n$a

VI$_n$a

VII$_n$a

VIII$_n$a

IX$_n$a

$X_na$

$XIII_na$

$XI_na$

$XIV_na$

$XII_na$

$XV_na$

XVI$_n$a

XVII$_n$a

XVIII$_n$a

XIX$_n$a

XX$_n$a

The invention provides a pentamethine cyanine dye and a method of producing the same. Since the pentamethine cyanine dye has advantages of large molar absorption coefficient, adjustable absorption and emission wavelengths, simple operation, a low fluorescence quantum yield and a low cytotoxicity, it is suitable as a fluorescent imaging material. In addition, the pentamethine cyanine dye also has the photo-induced blinking property, and thus it is suitable for the STORM and SOFI super-resolution imaging.

The application further provides a method of synthesizing a pentamethine cyanine dye, comprising:

(1) mixing glycerin, a benzaldehyde derivative and a toluene derivative in a mass ratio of 1:2-2.5:0.05-0.2; refluxing the reaction mixture at 50-60° C. for 6-10 h; removing water generated during the relaxing, and cooling the reaction mixture; washing the reaction mixture with an alkali solution; and subjecting the reaction mixture to extraction, drying and desolventization to give a paste intermediate (I);

(2) mixing the intermediate (I) and a solvent in a mass ratio of 1:1-4; adding an alkaline matter and a reactant to perform a reaction in a cold water bath; subjecting the reaction mixture to separation and purification to give an intermediate (II); acetalizing the intermediate (II) under acidic conditions to obtain a condensing agent;

(3) reacting indoline, benzoindole, benzothiazole, benzoxazole or benzimidazole containing a 2,3,3-trimethyl-5-$R_2$ ($R_3$)-3H substituent with $R_4$($R_5$)$CH_2$Z in a mass ratio of 1:1-4 at 80-148° C. for 6-36 h to obtain a quaternary ammonium salt; and (4) mixing the condensing agent, an alcohol, the quaternary ammonium salt and anhydrous pyridine in a mass ratio of 1:0.8-2:2-3:0.8-1.2; refluxing the reaction mixture at 50-60° C. under nitrogen for 6-13 h; and subjecting the reaction mixture to desolventization, washing, separation and purification to obtain the pentamethine cyanine dye;

where Z is halogen or OTS; $R_2$ and $R_3$ are independently selected from H, halogen, $(CH_2)_nR_8$, $CH_2C_6H_4R_8$, $SO_3H$, $SO_3^-$, $OCH_3$, $SCH_3$, benzyloxy group, $NO_2$, $O(CH_2)_nR_8$, $OCH_2C_6H_4R_8$ and CN; $R_4$ and $R_5$ are independently selected from $CH_3$, $CH_2CH_3$, $CH_2C_6H_5$, $CH_2C_6H_4F$, $(CH_2)_nR_8$ or $CH_2C_6H_4R_8$; m and n are integers from 1-18.

In an embodiment, in step (1), the benzaldehyde derivative is benzaldehyde or tolualdehyde; and the toluene derivative is selected from methylbenzene, toluenesulfonic acid and a combination thereof.

In an embodiment, in step (2), the reactant is selected from propargyl bromide, butane sultone, alkyne propoxylated ethoxylated bromine, benzyl bromide, 4-nitrobenzyl bromide, sulfate, p-toluenesulfonate and a combination thereof.

In an embodiment, in step (2), the alkaline matter is selected from potassium hydroxide, sodium hydroxide, sodium carbonate.

In an embodiment, in step (2), the oxidant is PCC, Jones reagent or a combination thereof.

In an embodiment, the condensing agent may be also prepared by the following steps:

mixing the intermediate (I) and a solvent in a mass ratio of 1:2-4; adding an organic base to perform a reaction for 1-2 h in an ice bath, wherein a mass ratio of the intermediate (I) to the organic base is 1:0.1-0.3; subjecting the reaction mixture to separation and purification; reacting the reaction mixture with anhydrous acetonitrile or DMF for 1-2 h; adding a phenolic derivative and an alkaline matter to perform a reaction for 2-3 h; subjecting the reaction mixture to desolventization, washing, separation and purification to give an intermediate (II); acetalizing the intermediate (II) under acidic conditions in the presence of an oxidant to obtain a condensing agent;

where a mass ratio of anhydrous acetonitrile or DMF to the reaction mixture obtained after the purification is 3-5:1; a mass ratio of the phenolic derivative to the intermediate (I) is 0.9-1.1:1; a mass ratio of the alkaline matter to the intermediate (I) is 0.1-0.3:1.

In an embodiment, in step (2), the solvent is dichloromethane or anhydrous chloroform.

In an embodiment, in step (2), the organic base is triethylamine or DIPEA.

In an embodiment, in step (2), the phenolic derivative is selected from p-cresol, 4-nitrophenol, p-chlorophenol, alpha-naphthol, beta-naphthol and a combination thereof.

Figure 1:
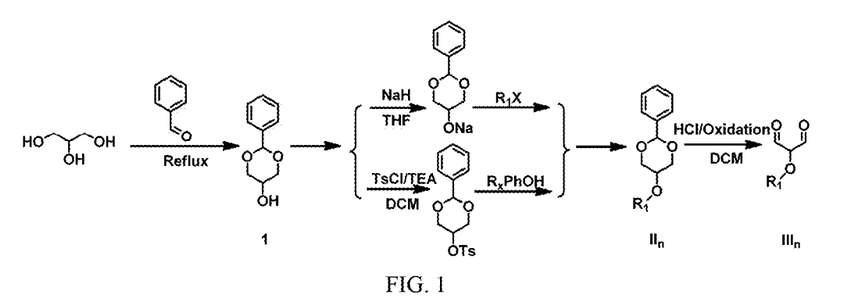
FIG. 1 schematically shows the synthetic route of a spackling compound according to the first embodiment of the invention.

The preparation process of the condensing agent was specifically shown in FIG. 1.

In an embodiment, in step (3), when Z is chlorine or bromine, KI may be added as a catalyst to accelerate the reaction and shorten the reaction time.

Figure 2:
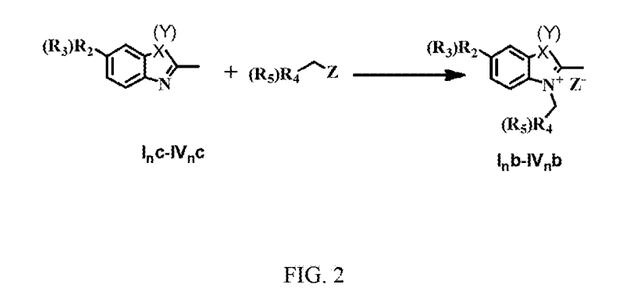
FIG. 2 schematically shows the synthetic route of quaternary ammonium salts according to an embodiment of the invention.

The preparation process of the quaternary ammonium salt was specifically shown in FIG. 2.

In an embodiment, the pentamethine cyanine dye may also be prepared by the following steps:

mixing the condensing agent, an alcohol, the quaternary ammonium salt and anhydrous pyridine in a mass ratio of 1:0.8-2:2-3:0.8-1.2; refluxing the reaction mixture at 50-60° C. under nitrogen until the reaction mixture appears to be dark blue; cooling the reaction mixture to room temperature; and subjecting the reaction mixture to desolventization, washing, separation and purification to obtain the pentamethine cyanine dye.

Figure 3:
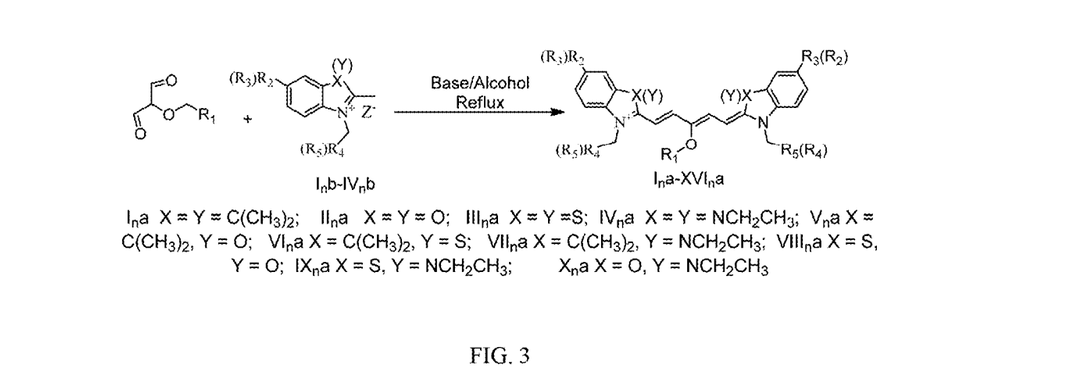
FIG. 3 schematically shows the synthetic route of a symmetrical pentamethine cyanine dye according to an embodiment of the invention.

It should be specified that the pentamethine cyanine dye prepared through the above process has a symmetrical structure, and the preparation process thereof is schematically shown in FIG. 3.

In an embodiment, the pentamethine cyanine dye may also be prepared by the following steps:

mixing the condensing agent, an alcohol, the quaternary ammonium salt and anhydrous pyridine in a mass ratio of 6:2-4:0.8-2:0.8-1.2; refluxing the reaction mixture at 50-60° C. under nitrogen until the reaction mixture appears to be yellowish green; and subjecting the reaction mixture to desolventization, separation and purification to obtain a yellow intermediate (III);

dissolving the yellow intermediate (III) with isopropanol; adding anhydrous pyridine and the quaternary ammonium salt to the reaction mixture respectively in a mass ratio of 0.1-0.3:1 and 0.1-0.2:1; reacting the reaction mixture at 50-60° C. for 5-6 h; cooling the reaction mixture to room temperature; and subjecting the reaction mixture to desolventization, separation and purification to produce the pentamethine cyanine dye.

It should be specified that the pentamethine cyanine dye obtained by such process has an asymmetrical structure.

Figure 4:
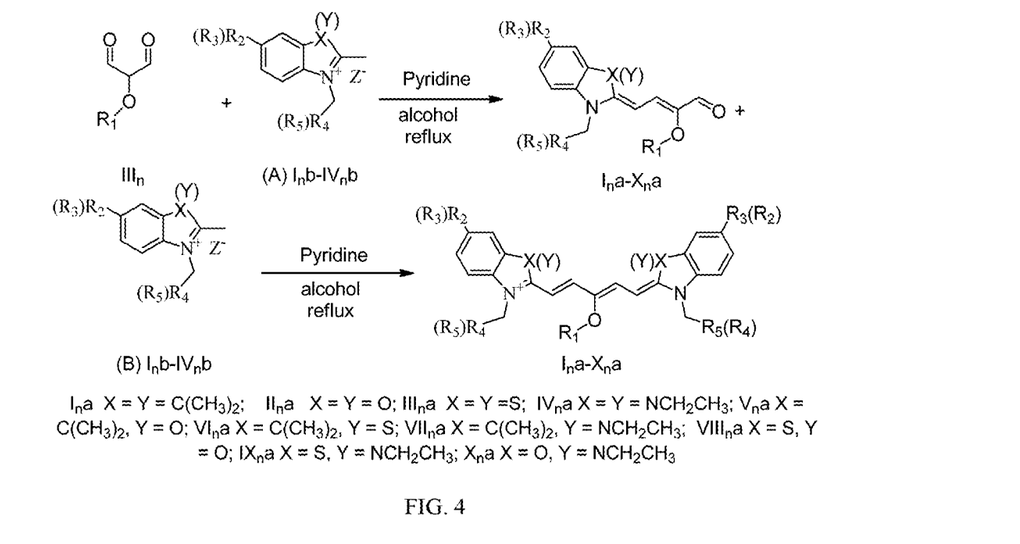
FIG. 4 schematically shows the synthetic route of an asymmetrical pentamethine cyanine dye according to an embodiment of the invention.
Figure 5A:
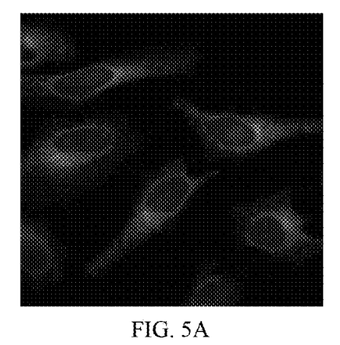
FIG. 5A shows the confocal fluorescence imaging of MCF-7 cells.
Figure 5B:
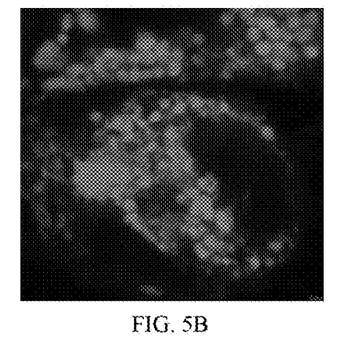
FIG. 5B shows the confocal fluorescence imaging of RAW-7 macrophages.
Figure 5C:
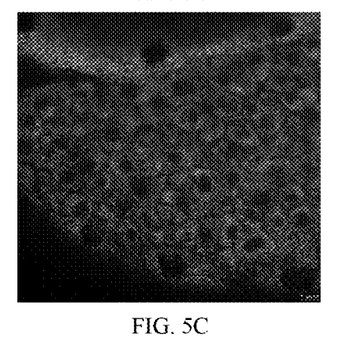
FIG. 5C shows the confocal fluorescence imaging of zebrafish embryo cells.
Figure 5D:
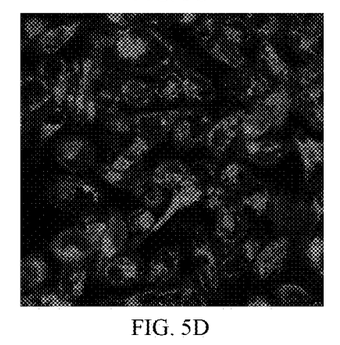
FIG. 5D shows the confocal fluorescence imaging of HeLa cells.

The preparation process of the asymmetrical pentamethine cyanine dye is schematically shown in FIG. 4.

The method provided herein has the advantages of simple operation, high yield and readily-available raw materials and low cost.

The preparation process of the pentamethine cyanine dye provided herein will be illustrated in detail below with reference to the embodiments.

1. PREPARATION OF QUATERNARY AMMONIUM SALT

Example 1

Synthesis of 2,3,3-trimethyl-3H-indoline Quaternary Ammonium Salt ($X=Y=C(CH_3)_2$)

100 g of 2,3,3-trimethyl-3H-indoline or 5-substituted-2,3,3-trimethyl-3H-indoline was dissolved in 200 g of methylbenzene, to which 150 g of p-toluenesulfonate was added. The reaction mixture was refluxed at 70° C. under nitrogen protection for 6 h. Then the reaction mixture was cooled to room temperature, washed with diethyl ether and filtered. The resulting filter residue was dried to give a pink solid (75% yield).

Example 2

Synthesis of 2,3,3-trimethyl-3H-indoline Quaternary Ammonium Salt ($X=Y=C(CH_3)_2$)

100 g of 5-substituted-2,3,3-trimethyl-3H-indoline was dissolved in 200 g of o-dichlorobenzene, to which 150 g of a sulfate was added. The reaction mixture was refluxed at 90° C. under nitrogen protection for 36 h. Then the reaction mixture was cooled to room temperature, washed with diethyl ether and filtered. The resulting filter residue was dried to obtain a pinkish white solid (79% yield).

Example 3

Synthesis of 2,3,3-trimethyl-3H-indoline Quaternary Ammonium Salt ($X=Y=C(CH_3)_2$)

100 g of 5-substituted-2,3,3-trimethyl-3H-indoline was dissolved in 200 g of acetonitrile, to which 150 g of halogenated $R_4$ or $R_5$ was added. The reaction mixture was refluxed at 80° C. under nitrogen protection for 26 h. Then the reaction mixture was cooled to room temperature, washed with diethyl ether and filtered. The resulting filter residue was dried to give a pinkish white solid (79% yield). The structure of $R_4$ or $R_5$ was referred to the foregoing examples, and the halogenated $R_4$ or $R_5$ was selected from $CH_2Cl$, $CH_2CH_2Cl$, $CHClC_6H_5$, $CH_2C_6H_4F$, $(CH_2)_nCl$, $CH_2C_6H_4Cl$, $CH_2Br$, $CH_2CH_2Br$, $CHBrC_6H_5$, $CHBrC_6H_4F$, (CH$_2$)$_n$Br, CH$_2$C$_6$H$_4$Br, CH$_2$I, CH$_2$CH$_2$I, CHIC$_6$H$_5$, CHIC$_6$H$_4$F, (CH$_2$)$_n$I and CH$_2$C$_6$H$_4$I.

Example 4

Synthesis of 2-methylbenzoxazole Quaternary Ammonium Salt (X,Y=O, S, NR$_6$)

100 g of 2-methylbenzoxazole was added to a high-pressure reactor, to which 300 g of a sulfate was added. The reaction mixture was solventlessly heated to 148° C. under nitrogen protection and reacted for 18 h. After the reaction was completed, the reaction mixture was cooled to room temperature, and the resulting solid product was collected, washed with diethyl ether and n-hexane and crystallized with propanone to give a white to pink solid powder (80% yield). The sulfate may be replaced with the halogenated R$_4$ or R$_5$ as listed in Example 3 or a p-toluenesulfonate.

Example 5

Synthesis of 2-methylbenzothiazole Quaternary Ammonium Salt (X,Y=O, S, NR$_6$)

100 g of 2-methylbenzothiazole or 1-N—R$_6$-2-methyl-benzimidazole was added to a high-pressure reactor, to which 300 g of p-toluenesulfonate of R$_4$ was added. The reaction mixture was solventlessly heated to 150° C. under nitrogen protection and reacted for 16 h. After the reaction was completed, the reaction mixture was cooled to room temperature, and the resulting solid product was collected, washed with diethyl ether and n-hexane and crystallized with propanone to give a white to pink solid powder (50% yield).

The R$_4$ p-toluenesulfonate may be replaced with the halogenated R$_4$ or R$_5$ as listed in Example 3 or a sulfate of R$_4$ or R$_5$.

Example 6

Synthesis of 1-N—R$_6$-2-methylbenzimidazole Quaternary Ammonium Salt (X,Y=O, S, NR$_6$)

100 of 1-N—R$_6$-2-methylbenzimidazole was added to a high-pressure reactor, to which 300 g of a sulfate of R$_4$ or R$_5$ was added. The reaction mixture was solventlessly heated to 160° C. under nitrogen protection and reacted for 18 h. After the reaction was completed, the reaction mixture was cooled to room temperature, and the resulting solid product was collected, washed with diethyl ether and n-hexane and crystallized with propanone to give a white to pink solid powder (70% yield). The sulfate may be replaced with the halogenated R4 or R5 as listed in Example 3, or a p-toluenesulfonate of R4 or R5

Example 7

Synthesis of N-ethyl-2,3,3-trimethyl-3H-indoline Quaternary Ammonium Salt 100 g of 2,3,3-trimethyl-3H-indoline was dissolved in 200 g of methylbenzene, to which 150 g of iodoethane was added. The reaction mixture was refluxed at 90° C. under nitrogen protection for 16 h. Then the reaction mixture was cooled to room temperature, washed with diethyl ether and filtered. The resulting filter residue was dried to give a pink to white solid (90% yield).

Example 8

Synthesis of Benzoindoline Quaternary Ammonium Salt 100 g of benzoindoline was dissolved in 200 g of 1,2-dichlorobenzene, to which 150 g of iodoethane was added. The reaction mixture was refluxed at 110° C. under nitrogen protection for 15 h. Then the reaction mixture was cooled to room temperature, washed with diethyl ether and filtered. The resulting filter residue was dried to give a pink to white solid (90% yield).

The benzoindoline may be replaced with 2,3,3-trimethyl-3H-indoline or 5-substituted-2,3,3-trimethyl-3H-indoline.

Example 9

Synthesis of Benzoindoline Quaternary Ammonium Salt 100 g of 5-substituted-2,3,3-trimethyl-3H-indoline was dissolved in 200 g of methylbenzene, to which 100 g of iodoethane was added. The reaction mixture was refluxed at 110° C. under nitrogen protection for 6 h. Then the reaction mixture was cooled to room temperature, washed with n-hexane and filtered. The resulting filter residue was dried to give a pink to white solid (90% yield).

The 5-substituted-2,3,3-trimethyl-3H-indoline may be replaced with 2,3,3-trimethyl-3H-indoline or benzoindoline.

Example 10

Synthesis of N-benzyl-2,3,3-trimethyl-3H-indoline Quaternary Ammonium Salt 100 g of 2,3,3-trimethyl-3H-indoline was dissolved in 200 g of methylbenzene, to which 200 g of benzyl bromide was added. The reaction mixture was refluxed at 120° C. under nitrogen protection for 8 h. Then the reaction mixture was cooled to room temperature, washed with n-hexane and filtered. The resulting filter residue was dried to give a pink solid (75% yield).

The 2,3,3-trimethyl-3H-indoline may be replaced with 5-substituted-2,3,3-trimethyl-3H-indoline or benzoindoline.

Example 11

Synthesis of N-sulfobutyl-2,3,3-trimethyl-3H-indoline Quaternary Ammonium Salt 100 g of 2,3,3-trimethyl-3H-indoline was dissolved in 200 g of 1,2-dichlorobenzene, to which 200 g of butylsulfonate was added. The reaction mixture was refluxed at 100° C. under nitrogen protection for 7 h. Then the reaction mixture was cooled to room temperature, washed with diethyl ether or propanone and filtered. The resulting filter residue was dried to give a grayish white solid (86% yield).

The 2,3,3-trimethyl-3H-indoline may be replaced with 5-substituted-2,3,3-trimethyl-3H-indoline or benzoindoline.

Example 12

Synthesis of N-n-pentyl-2,3,3-trimethyl-3H-indoline Quaternary Ammonium Salt 100 g of 2,3,3-trimethyl-3H-indoline was dissolved in 200 g of methylbenzene, to which 300 g of bromopentane and 50 g of potassium iodide were added, where the potassium iodide was used as a catalyst. The reaction mixture was refluxed at 100° C. under nitrogen protection for 18 h. Then the reaction mixture was cooled to room temperature, washed with diethyl ether and filtered. The resulting filter residue was dried to give a red viscous solid (62% yield).

The 2,3,3-trimethyl-3H-indoline may be replaced with 5-substituted-2,3,3-trimethyl-3H-indoline or benzoindoline; methylbenzene may be replaced with 1,2-dichlorobenzene; and diethyl ether may be replaced with propanone.

Example 13

Synthesis of N-naphthylmethyl-2,3,3-trimethyl-5-methyl-3H-indoline Quaternary Ammonium Salt 100 g of 2,3,3-trimethyl-5-methyl-3H-indoline was dissolved in 200 g of methylbenzene, to which 400 g of chloromethyl naphthalene and 40 g of potassium iodide were added, where the potassium iodide was used as a catalyst. The reaction mixture was refluxed at 150° C. under nitrogen protection for 17 h. Then the reaction mixture was cooled to room temperature, washed with propanone and filtered. The resulting filter residue was dried to give a red to greyish white solid (51% yield).

The 2,3,3-trimethyl-3H-5-methyl-indoline may be replaced with benzoindoline and propanone may be replaced with diethyl ether.

Example 14

Synthesis of N-naphthylmethyl-2,3,3-trimethyl-5-sulfo-3H-indoline Quaternary Ammonium Salt 100 g of 2,3,3-trimethyl-5-sulfo-3H-indoline was dissolved in 200 g of methylbenzene, to which 400 g of chloromethyl naphthalene and 40 g of potassium iodide were added, where the potassium iodide was used as a catalyst. The reaction mixture was refluxed at 160° C. under nitrogen protection for 17 h. Then the reaction mixture was cooled to room temperature, washed with propanone and filtered. The resulting filter residue was dried to give a red to greyish white solid (51% yield).

The 2,3,3-trimethyl-5-sulfo-3H-indoline may be replaced with benzoindoline, and propanone may be replaced with diethyl ether.

Example 15

Synthesis of N-ethyl-2-methylbenzothiazole Quaternary Ammonium Salt 100 g of 2-methylbenzothiazole was added to a 25 mL high-pressure reactor, to which 250 g of iodoethane was added. The reaction mixture was solventlessly reacted at 160° C. under nitrogen protection for 10 h. After the reaction was completed, the reaction mixture was cooled to room temperature, crystallized with 100 g of propanone for 2 h, washed with diethyl ether and filtered. The resulting filter residue was dried to give a pink to white solid (87% yield).

The 2-methylbenzothiazole may be replaced with 2-methylbenzoxazole or N-ethyl-2-methylbenzimidazole, and diethyl ether may be replaced with propanone.

Example 16

Synthesis of N-benzyl-2-methylbenzothiazole Quaternary Ammonium Salt 100 g of 2-methylbenzothiazole was added to a 25 mL high-pressure reactor, to which 250 g of benzyl bromide was added. The reaction mixture was solventlessly reacted at 160° C. under nitrogen protection for 4 h. Then the reaction mixture was cooled to room temperature, crystallized with 200 g of propanone for 2 h, washed with diethyl ether and filtered. The resulting filter residue was dried to give a pink to white solid (63% yield).

The 2-methylbenzothiazole may be replaced with 2-methylbenzoxazole or N-ethyl-2-methylbenzimidazole, and diethyl ether may be replaced with propanone.

Example 17

Synthesis of N-sulfobutyl-2-methylbenzothiazole Quaternary Ammonium Salt 100 g of 2-methylbenzothiazole was added to a 25 mL high-pressure reactor, to which 150 g of butylsulfonate was added. The reaction mixture was solventlessly reacted at 160° C. under nitrogen protection for 13 h. Then the reaction mixture was cooled to room temperature, crystallized with propanone for 1 h, washed with diethyl ether and filtered. The resulting filter residue was dried to give a white solid (86% yield).

The 2-methylbenzothiazole may be replaced with 2-methylbenzoxazole or N-ethyl-2-methylbenzimidazole, and diethyl ether may be replaced with propanone or n-hexane.

Example 18

Synthesis of N-n-pentyl-2-methylbenzothiazole, 2-methylbenzoxazole or N-ethyl-2-methylbenzimidazole Quaternary Ammonium Salt 100 g of 2-methylbenzothiazole was added to a 25 mL high-pressure reactor, to which 300 g of 5-bromopentane was added. The reaction mixture was solventlessly reacted at 160° C. under nitrogen protection for 12 h. Then the reaction mixture was cooled to room temperature, crystallized with 200 g of propanone for 3 h, washed with diethyl ether and filtered. The resulting filter residue was dried to give a white to pink solid (46% yield).

The 2-methylbenzothiazole may be replaced with 2-methylbenzoxazole or N-ethyl-2-methylbenzimidazole, and diethyl ether may be replaced with propanone or n-hexane.

Example 19

Synthesis of N-naphthylmethyl-2-methylbenzothiazole, 2-methylbenzoxazole or N-ethyl-2-methylbenzimidazole Quaternary Ammonium Salt 100 g of 2-methylbenzothiazole was added to a 25 mL high-pressure reactor, to which 300 g of chloromethyl naphthalene was added. The reaction mixture was solventlessly reacted at 160° C. under nitrogen protection for 12 h. Then the reaction mixture was cooled to room temperature, crystallized with propanone for 1.5 h, washed with diethyl ether and filtered. The resulting filter residue was dried to give a white to pink solid (55% yield).

The 2-methylbenzothiazole may be replaced with 2-methylbenzoxazole or N-ethyl-2-methylbenzimidazole, and diethyl ether may be replaced with propanone or n-hexane.

2. PREPARATION OF A CONDENSING AGENT

Example 20

100 g of glycerin was dissolved in methylbenzene in a reactor, to which 300 g of benzaldehyde and 10 g of p-toluenesulfonic acid were added to produce a solution. After the reactor was connected to a water separator, the reaction mixture was refluxed at 50-60° C. for 6-10 h until there was no water generated in the water separator any more. The reaction mixture was cooled and washed with NaH aqueous solution to remove unreacted glycerin, benzaldehyde and p-toluenesulfonic. After the reaction mixture was stratified, the organic phase was collected, dried with anhydrous $Na_2SO_4$ and evaporated under rotation to remove the organic solvent to give a milky paste product, i.e., 2-hydroxyl-1,3-benzaldehyde propylene glycol acetal.

Example 21

Preparation of a 2-alkoxy-1,3-malondialdehyde or 2-benloxy-1,3-malondiaidehyde Condensing Agent 100 g of the acetal prepared in Example 20 was dissolved in 200 g of anhydrous tetrahydrofuran. Under an ice water bath, the reaction mixture was added with 20 g of NaH powder, stirred for 1 h and dropwise added with propargyl bromide. The reaction mixture was continuously stirred for 10 h. The reaction mixture was desolventized and rapidly purified to give 2-alkoxy-1,3-propanediol. Then the 2-alkoxy-1,3-propanediol was oxidized by PCC or Jones reagent to allow the hydroxyl group to be converted into the aldehyde group. The oxidized product was purified using column separation to give a pale yellow 2-alkoxy-substituted 1,3-malondialdehyde condensing agent.

The propargyl bromide may be replaced with butylsulfonate, propargyloxyethoxy bromide, benzyl bromide, 4-nitrobenzyl bromide, sulfate or p-toluenesulfonate.

Example 22

Preparation of a 2-phenoxy-1,3-malondialdehyde Condensing Agent 1) 100 g of acetal prepared in Example 20 was added to 300 g of anhydrous dichloromethane. Under an ice water bath, the reaction mixture was added with 20 g of triethylamine and stirred for 15 min. After continuously stirred for 10 h under the ice water bath, the reaction mixture was desolventized and rapidly purified to give 2-alkoxy-1,3-propanediol acetal, which was added to 400 g of anhydrous acetonitrile to prepare a solution.

2) 100 g of p-cresol and 20 g of anhydrous potassium carbonate were added in a vessel and reacted under an ice water bath for 0.5 h. The solution prepared in step 1) was added, and the reaction mixture was reacted for 1 h, separated and purified to give 2-phenoxy or naphthyloxy-1,3-propanediol acetal, which was oxidized by PCC or Jones reagent to allow the 1,3-dihydroxyl group to be converted into the aldehyde group. The oxidized product was purified using column separation to give a pale yellow 2-phenoxy-substituted 1,3-malondialdehyde condensing agent.

Among the above process, the dichloromethane may be replaced with anhydrous chloroform; triethylamine may be replaced with DIPEA; anhydrous acetonitrile may be replaced with DMF; p-cresol may be replaced with p-nitrophenol, p-chlorophenol, 1-naphthol or 2-naphthol; and anhydrous potassium carbonate may be replaced with anhydrous sodium carbonate or sodium hydroxide.

3. SYNTHESIS OF SYMMETRICAL PENTAMETHINE CYANINE DYES

Example 23

Synthesis of 2,3,3-trimethyl-3H-indoline Symmetrical Pentamethine Cyanine Dyes 100 g of the condensing agent prepared in Example 21 or 22 was added to 100 g of dry ethanol or isopropyl alcohol, to which the quaternary ammonium salt prepared in any one of Examples 1-19 and 100 g of anhydrous pyridine were added. The reaction mixture was refluxed at 50° C. under nitrogen protection until it appeared to be dark blue. Then the reaction mixture was cooled to room temperature and desolventized under vacuum. The resulting residue was washed with a mixed solvent of anhydrous diethyl ether and n-hexane and separated and purified using column chromatography to give a blue solid dye (30-60% yield).

Example 24

Synthesis of 2-methylbenzothiazole, 2-methylbenzoxazole, and N-ethyl-2-methylbenzimidazole Symmetrical Pentamethine Cyanine Dyes 100 g of the condensing agent prepared in Example 21 or 22 was added to 100 g of dry ethanol or isopropyl alcohol, to which 220-250 g of the quaternary ammonium salt prepared in any one of Examples 1-19 and 100 g of anhydrous pyridine as an alkali were added. The reaction mixture was refluxed at 50° C. under nitrogen protection until it appeared to be dark blue. Then the reaction mixture was cooled to room temperature and desolventized under vacuum. The resulting residue was washed with anhydrous diethyl ether and separated and purified using column chromatography to give a corresponding blue solid dye powder (15-55% yield).

Among the above process, anhydrous diethyl ether may be replaced with n-hexane.

4. SYNTHESIS OF ASYMMETRICAL PENTAMETHINE CYANINE DYES

Example 25

Synthesis of 2,3,3-trimethyl-3H-indoline Asymmetrical Pentamethine Cyanine Dyes ($X \neq Y$, or $R_2$-$R_5$ Were Each Different)

600 g of the condensing agent prepared in Example 21 or 22 was added to 300 g of dry ethanol or isopropyl alcohol, to which 100 g of 2,3,3-trimethyl-3H-indoline quaternary ammonium salt prepared in any one of Examples 1-3 and 100 g of anhydrous pyridine were added. The reaction mixture was refluxed at 50° C. under nitrogen protection until the reaction was completed. The resulting yellowish green reaction mixture was evaporated under rotation to remove the solvent and separated and purified using column chromatography to give a yellow intermediate. Then the intermediate was dissolved in 300 g of anhydrous isopropyl alcohol, to which 100 g of pyridine and 300 g of the 2,3,3-trimethyl-3H-indoline quaternary ammonium salt prepared in any one of Examples 1-3 were added. The reaction mixture was continuously heated until the raw materials were completely consumed. Then the reaction mixture was cooled to room temperature, desolventized under vacuum and purified using column chromatography to give a corresponding blue solid (53% yield).

Among the above process, ethanol may be replaced with isopropyl alcohol.

Example 26

Synthesis of 2-methylbenzothiazole Asymmetrical Pentamethine Cyanine Dyes (X≠Y, or $R_2$-$R_5$ Were Each Different)

500 g of the condensing agent prepared in Example 21 or 22 was added to 300 g of dry ethanol, to which 100 g of the quaternary ammonium salt prepared in any one of Examples 4-9 and 100 g of anhydrous pyridine were added. The reaction mixture was refluxed at 50° C. under nitrogen protection until the reaction was completed. The resulting yellowish green reaction mixture was evaporated under rotation to remove the solvent, and separated and purified using column chromatography to give a yellow intermediate. Then the intermediate was dissolved in 100 g of anhydrous isopropyl alcohol, to which pyridine and 100 g of the quaternary ammonium salt prepared in any one of Examples 4-9 were added. The reaction mixture was continuously heated until the raw materials were completely consumed. Then the reaction mixture was cooled to room temperature, desolventized under vacuum and purified using column chromatography to give a corresponding blue solid (36% yield).

Among the above process, ethanol may be replaced with isopropyl alcohol.

5. APPLICATION OF THE DYES IN BIOLOGICAL FLUORESCENCE IMAGING

1) Preparation of a Dye Mother Liquor 1 mol of the dye prepared in Example 18 or 19 was added to a brown glass bottle, to which 100 mL of HPLC-grade DMSO solvent. The reaction mixture was mixed evenly to obtain 1 mM dye mother liquor.

2) MCF-7 living cells, RAW-7 macrophages, zebrafish embryo cells and HeLa cells were respectively seeded in a cell culture dish. After the cells were cultured for 48 h, the medium was replaced, and the dye mother liquor prepared in step 1) was added to the culture dish to enable the dye to have a final concentration of 1 μM. Then the culture dish was placed at 37° C. for 10 mM, and the medium was removed. The culture dish was washed with PBS buffer three times and placed on an objective table of LSCM, where a long-pass filter with an excitation wavelength of 633 nm and an emission wavelength of 645 nm was selected for observation. The confocal fluorescence imaging results of MCF-7 living cells, RAW-7 macrophages, zebrafish embryo cells and HeLa cells were respectively shown in FIGS. 5a-5d, and it can be seen that the dye was capable of entering the living cells and had selectivity in cells, and thus it was suitable as a fluorescent dye for the detection of living cell.

6. STOM SUPER-RESOLUTION IMAGING DETECTION

Figure 6:
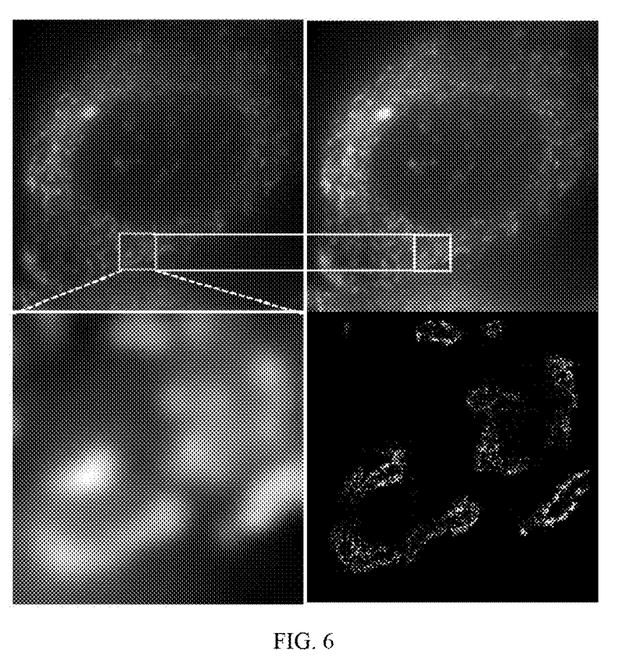
FIG. 6 shows the STOM super-resolution imaging of living cells.

The dye of Example 18 or 19 was prepared into 1 mM mother liquor according to the above-mentioned method, and the mother liquor was diluted with water to a concentration at which there was no molecular aggregation observed. Then the diluted solution was evenly spread on a cover glass using a spin coater. The cover glass continuously irradiated with a laser of a wavelength of 633 nm in a STORM super-resolution microscopy imaging system, and observed under a microscope for the photo-induced blinking effect. The dye was further co-cultured with living cells, and an oxidoreductase was introduced for the STORM super-resolution imaging detection of live cell. It can be seen from FIG. 6 that the dye had a significant photo-induced blinking effect in living cells.

Described above are merely preferred embodiments of the application, and are not intended to limit the application. Various modifications, replacements and improvements made by those skilled in the art without departing from the spirit of the application should fall within the scope of the application.

What is claimed is:
1. A method of preparing a pentamethine cyanine dye of formula (I):

wherein X and Y are independently selected from O, S, $C(CH_3)_2$ and $NR_6$;
$R_1$ is $(CH_2)_nR_7$ or $(CH_2)_mC_6H_4R_7$;
$R_2$ and $R_3$ are independently selected from H, halogen, $(CH_2)_nR_8$, $CH_2C_6H_4R_8$, $SO_3H$, $SO_3^-$, $OCH_3$, $SCH_3$, benzyloxy group, $NO_2$, $O(CH_2)_nR_8$, $OCH_2C_6H_4R_8$ and CN;
$R_4$ and $R_5$ are independently selected from $CH_3$, $CH_2CH_3$, $CH_2C_6H$, $CH_2C_6H_4F$, $(CH_2)_nR_8$ and $CH_2C_6H_4R_8$;
$R_6$ is $(CH_2)_nR_8$ or $CH_2C_6H_4R_8$;
$R_7$ is selected from H, ethynyl, vinyl, phenyl, naphthyl, imidazole, pyrazole, oxazole, thiazole, furan, pyrrole heterocycle, $C_6H_4R_9$, phenylboronic acid alcohol ester, propargyl, folic acid, methotrexate, arginine(R)-glycine (G)-aspartic acid(D) (RGD), biotin, $SO_3R_{10}$ and $COOR_{11}$;
$R_8$ is H, $SO_3R_{10}$ or $COOR_{11}$;
$R_9$ is selected from H, arsonic acid, boric acid, carboxylic acid, sulfonic acid, $C_1$-$C_{18}$ alkyl, amino, O and S;
$R_{10}$ is $N(R_{12}R_{13}R_{14}R_{15})$; $R_{11}$ is a $C_1$-$C_{18}$ alkyl; $R_{12}$, $R_{13}$, $R_{14}$ and $R_{15}$ are independently selected from H, $C_1$-$C_{18}$ alkyl, $(CH_2)_mOR_8$ and $(CHR_9CH_2O)_pR_8$;
m, n and p each are integers independently selected from 1-18;

the method comprising:
(1) mixing glycerin, a benzaldehyde derivative and a toluene derivative in a mass ratio of 1:2-2.5:0.05-0.2, wherein the toluene derivative is composed of methylbenzene and toluenesulfonic acid; refluxing the reaction mixture at 50-60° C. for 6-10 h; removing water generated during the refluxing, and cooling the reaction mixture; washing the reaction mixture with an alkali solution; and subjecting the reaction mixture to extraction, drying and desolventization to give a paste intermediate (I);
(2) mixing the intermediate (I) and a solvent in a mass ratio of 1:1-4; adding an alkaline matter and a reactant to perform a reaction in a cold water bath, wherein the reactant is propargyl bromide; subjecting the reaction mixture to separation and purification to give an intermediate (II); and acetalizing the intermediate (II) under acidic conditions to obtain a condensing agent;
(3) reacting indoline with $R_4(R_5)CH_2Z$ in a mass ratio of 1:1-4 at 80-148° C. for 6-36 h to obtain a quaternary ammonium salt, wherein the indoline contains a 2,3,3-trimethyl-5-$R_2$-3H substituent or a 2,3,3-trimethyl-5-$R_3$-3H substituent, and Z is halogen or OTs; and
(4) mixing the condensing agent, an alcohol, the quaternary ammonium salt and anhydrous pyridine in a mass ratio of 1:0.8-2:2-3:0.8-1.2; refluxing the reaction mixture at 50-60° C. under nitrogen until the reaction mixture appears to be dark blue; cooling the reaction mixture to room temperature; and subjecting the reaction mixture to desolventization, washing, separation and purification to obtain the pentamethine cyanine dye.

2. The method of claim 1, wherein in step (2), the solvent is tetrahydrofuran, and the mass ratio of the intermediate (I) to tetrahydrofuran is 1:1-3; the reaction is performed for 0.5-1 h; and an oxidant is used during the acetalization.

3. The method of claim 2, wherein in step (2), a mass ratio of the alkaline matter to the intermediate (I) is 1:0.1-0.3; the alkaline matter is selected from potassium hydroxide, sodium hydroxide, sodium carbonate and a combination thereof; and the oxidant is pyridinium chlorochromate (PCC), Jones reagent or a combination thereof.

4. The method of claim 3, wherein in step (4), the alcohol is ethanol or isopropanol.

5. The method of claim 1, wherein step (2) further comprises:
mixing the intermediate (I) and a solvent in a mass ratio of 1:2-4; adding an organic base to perform a reaction for 1-2 h in an ice bath, wherein a mass ratio of the intermediate (I) to the organic base is 1:0.1-0.3; subjecting the reaction mixture to separation and purification; reacting the reaction mixture with anhydrous acetonitrile or DMF for 1-2 h; adding a phenolic derivative and an alkaline matter to perform a reaction for 2-3 h; subjecting the reaction mixture to desolventization, washing, separation and purification to give an intermediate (II); acetalizing the intermediate (II) under acidic conditions in the presence of an oxidant to obtain a condensing agent;
wherein a mass ratio of anhydrous acetonitrile or DMF to the reaction mixture is 3-5:1; a mass ratio of the phenolic derivative to the intermediate (I) is 0.9-1.1:1; a mass ratio of the alkaline matter to the intermediate (I) is 0.1-0.3:1.

6. The method of claim 5, wherein in step (2), the alkaline matter is selected from potassium hydroxide, sodium hydroxide, sodium carbonate and a combination thereof; the reactant is selected from propargyl bromide, butane sultone, propynyloxy ethoxy bromine, benzyl bromide, 4-nitrobenzyl bromide, sulfate, p-toluenesulfonate and a combination thereof, and the oxidant is pyridinium chlorochromate (PCC), Jones reagent or a combination thereof.

7. The method of claim 6, wherein in step (2), the solvent is dichloromethane or anhydrous chloroform; the organic base is triethylamine or DIPEA; and the phenolic derivative is selected from 4-methylphenol, 4-nitrophenol, 4-chlorophenol, 1-naphthol, 2-naphthol and a combination thereof.

8. The method of claim 7, wherein in step (4), the alcohol is ethanol or isopropanol.

* * * * *